United States Patent
Mussmann et al.

(10) Patent No.: US 6,576,207 B1
(45) Date of Patent: Jun. 10, 2003

(54) OXYGEN STORING MATERIAL WITH HIGH THERMAL STABILITY AND A PROCESS FOR PREPARATION AND USE THEREOF

(75) Inventors: Lothar Mussmann, Offenbach (DE); Renee Van Yperen, Loenen ad/Vecht (NL); Dieter Lindner, Hanau (DE); Thomas Kreuzer, Karben (DE); Egbert Lox, Hanau (DE)

(73) Assignee: Degussa Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/056,795

(22) Filed: Apr. 8, 1998

(30) Foreign Application Priority Data

Apr. 9, 1997 (DE) .......................... 197 14 707

(51) Int. Cl.$^7$ .............................. B01J 8/00; B01J 23/00
(52) U.S. Cl. ........................ 423/212; 502/303; 502/304
(58) Field of Search ................................ 502/304, 303; 423/212

(56) References Cited

U.S. PATENT DOCUMENTS

| | | | | |
|---|---|---|---|---|
| 4,438,219 A | * | 3/1984 | Brandenburg et al. | 502/333 |
| 5,147,842 A | * | 9/1992 | Funabiki et al. | 502/304 |
| 5,200,384 A | * | 4/1993 | Funabiki et al. | 502/304 |
| 5,556,825 A | | 9/1996 | Shelef et al. | 502/303 |
| 5,626,826 A | * | 5/1997 | Chopin et al. | 423/213.2 |
| 5,898,014 A | * | 4/1999 | Wu et al. | 502/302 |
| 5,945,369 A | * | 8/1999 | Kimura et al. | 502/304 |
| 5,976,476 A | * | 11/1999 | Blanchard et al. | 423/213.2 |
| 6,107,240 A | * | 8/2000 | Wu et al. | 502/304 |
| 6,133,194 A | * | 10/2000 | Cuif et al. | 502/506 |

FOREIGN PATENT DOCUMENTS

| | | | | |
|---|---|---|---|---|
| EP | 0337809 | 10/1989 | | |
| EP | 04444470 | 9/1991 | | |
| EP | 0827775 | 3/1998 | | |
| FR | WO96/21506 | * | 7/1996 | B01J/23/83 |

OTHER PUBLICATIONS

WIPO 98/28063 Jul. 2, 1998.
WIPO 98/42437, Oct. 1, 1998.
WIPO 98/45027, Oct. 15, 1998.

* cited by examiner

*Primary Examiner*—Wayne A. Langel
*Assistant Examiner*—Jonas N. Strickland
(74) *Attorney, Agent, or Firm*—Kalow & Springut LLP (57) ABSTRACT

An oxygen storing material with high thermal stability is disclosed which contains cerium oxide and at least one stabilizer from the group praseodymium oxide, lanthanum oxide, yttrium oxide and neodymium oxide, wherein the stabilizer(s) and optionally cerium oxide are present in highly dispersed form on the specific surface area of a high surface area support material from the group aluminum oxide, zirconium oxide, titanium oxide, silicon dioxide, cerium oxide and mixed oxides thereof and the oxygen storing material still has a specific surface area of more than 20, preferably more than 30 m$^2$/g, after calcination in air at 900° C. for a period of 10 hours.

17 Claims, 4 Drawing Sheets

OXYGEN STORING MATERIAL WITH HIGH THERMAL STABILITY AND A PROCESS FOR PREPARATION AND USE THEREOF

INTRODUCTION AND BACKGROUND

The present invention relates to an oxygen storing material and a process for preparation thereof. In another aspect, the present invention relates to the use thereof for the catalytic conversion of materials, in particular for the exhaust gas purification treatment of internal combustion engines.

Internal combustion engines emit in the exhaust gas, as harmful substances, essentially carbon monoxide CO, unburnt hydrocarbons HC and nitrogen oxides NOx, a high percentage of which are converted by modern exhaust gas treatment catalysts into harmless components; namely, water, carbon dioxide and nitrogen. The reaction takes place under substantially stoichiometric conditions, that is the oxygen contained in the exhaust gas is controlled using a so-called lamda probe so that the oxidation of carbon monoxide and hydrocarbons and the reduction of nitrogen oxides to nitrogen can take place approximately quantitatively. The catalysts developed for this purpose are known as three-way catalytic converters. They usually contain, as catalytically active components, one or more metals from the platinum group in the Periodic Table of Elements deposited on high surface area support materials such as γ-aluminum oxide with specific surface areas of more than 100 m$^2$/g.

Stoichiometric conditions prevail with normalized air/fuel ratios λ of one. The normalized air/fuel ratio λ is the air to fuel ratio normalized to stoichiometric conditions. The air/fuel ratio states how many kilograms of air are required for complete combustion of one kilogram of fuel. In the case of conventional gasoline fuels, the stoichiometric air/fuel ratio has a value of 14.6. The engine exhaust gas, depending on the load and speed, exhibits larger or smaller periodic variations in normalized air/fuel ratio around the value 1. For better conversion of the oxidizable, harmful components under these conditions, oxygen storing components such as, for example, cerium oxide are used which bond the oxygen by changing the oxidation state of-the cerium from Ce$^{3+}$ to Ce$^{4+}$ when it is present in excess and release it again for oxidative conversion by changing from Ce$^{4+}$ back to Ce$^{3+}$ when there is deficiency of oxygen in the exhaust gas.

Automotive exhaust gas catalysts operate with exhaust gas temperatures of up to 1100° C. These high temperatures require the use of catalyst materials, which have appropriate thermal resistance and long term stability.

EP 0 444 470 B1 describes a high surface area cerium oxide which consists of an intimate mixture of cerium oxide with 5 to 25 mol. %, with respect to the moles of cerium oxide, of a cerium oxide stabilizer. Lanthanum, neodymium and yttrium are mentioned as stabilizers. The material is obtained by coprecipitation from a common solution of a cerium oxide precursor and a precursor for the cerium oxide stabilizer.

According to EP 0 715 879 A1, the oxygen storing capacity of cerium oxide can be used to the optimum extent if it is deposited in the form of particles with diameters of 5 to 100 nm on a porous support material such as, for example, aluminum oxide. For this purpose, a dispersion of the powdered support material and a cerium oxide sol which has particle diameters in the cited range is made up. A honeycomb carrier structure is coated with this dispersion and then dried and calcined for a period of 1 hour at 650° C. A cerium oxide sol together with a zirconium oxide sol may also be used. As a result of calcination, the particle sizes of the cerium oxide on the support material are increased to more than 35 nm. If cerium oxide sol and zirconium oxide sol are used together, then a solid solution of cerium oxide and zirconium oxide with particle sizes of about 60 nm is formed as a result of calcining the coating (750° C., 1 h).

EP 0 337 809 B1 describes a catalyst composition which contains inter alia zirconium oxide particles stabilized with cerium oxide. The zirconium oxide particles are stabilized with cerium oxide by soaking zirconium oxide with a cerium salt solution. The soaked particles obtained in this way are dried and calcined until a graphical representation of the X-ray diffraction pattern no longer shows a peak for the crystalline form of cerium oxide. The cerium oxide is present in the cerium oxide/zirconium oxide mixture in an amount of 10 to 50 wt. %, with respect to zirconium oxide. In addition to the cerium salt, an yttrium and/or calcium salt may also be used. After calcination for 10 hours in air at a temperature of 900° C., the X-ray diffraction pattern of the material shows only a peak for tetragonal zirconium oxide and no peak for cerium oxide. Cerium oxide is thus present in this material substantially in the form of a solid solution with the zirconium oxide.

The processes known from the prior art for preparing an oxygen storing material thus use coprecipitation processes and impregnation processes in order to stabilize cerium oxide by adding other components or to deposit cerium oxide on support materials. Alternatively, cerium oxide may be deposited directly onto the support materials in particle form by using a cerium oxide sol.

The disadvantage of a coprecipitation process is the fact that the material obtained has too high a percentage of cerium oxide which cannot be fully utilized for the task of oxygen storing because the oxygen storing process takes place substantially at the surface and thus the deeper lying regions within the material are not available for storage.

In the case of known impregnation processes or the deposition of sols, chromatographic effects occur during dewatering of the treated material and these lead to non-uniform distribution of the cerium oxide on the support material. It has been shown that pore volume impregnation, which avoids chromatographic effects, also leads to unsatisfactory results because only a volume of solvent which corresponds to the water absorption capacity of the support material is used. In addition the volume of solvent in this process is restricted by the water absorption capacity so that it is not possible to dissolve completely variable amounts of cerium salts therein.

Van Dillen et al (Proc, 6th Conf. on Cat., London, ed., G. C. Bond, P. B. Wells, F. C. Tomkins, 2667 (1976)) describe a process for preparing copper and nickel catalysts on high surface area support materials. In this process the support material, together with a precursor for the active component, is dispersed in water. The active component is precipitated onto the surface of the support material by injection of a basic or acidic solution into the dispersion using a capillary (capillary injection). In order to avoid rapid precipitation of the active component in the solution itself, precipitation has to be performed with only slight supersaturation of the entire dispersion. In order to ensure homogeneous precipitation in the entire solution, the basic or acidic solution has to be introduced in small amounts per unit of time and distributed uniformly by stirring the dispersion.

SUMMARY OF THE INVENTION

An object of the present invention is to provide an oxygen storing material which is characterized by high thermal stability and long term stability and which can be prepared in a simple manner.

In achieving this and other objects, one feature of the present invention is an oxygen storing material with high thermal stability which contains cerium oxide and at least one stabilizer selected from the group consisting of praseodymium oxide, lanthanum oxide, yttrium oxide and neodymium oxide, wherein the stabilizer(s) are present in highly dispersed form on the surface of a high surface area support material and the oxygen storing material still has a specific surface area of more than 20, preferably more than 30 m$^2$/g, after calcination in air at 900° C. for a period of 10 hours.

BRIEF DESCRIPTION OF DRAWINGS

The present invention will be further understood with reference to the drawings, wherein.

DETAILED DESCRIPTION OF INVENTION

The invention will now be described in further detail.

The expression "oxygen storing material" is understood to mean, in the context of this invention, the combination of support material and stabilizers. In the material according to the invention, it is substantially cerium oxide which exhibits the oxygen storing function. However, praseodymium oxide can also store oxygen. Its storage capacity, however, is smaller than that of cerium oxide. Cerium oxide is therefore in the context of this invention called "the oxygen storing compound" whereas praseodymium oxide, despite its oxygen storing capacity, is included in the stabilizers.

The oxygen storing compound in the material according to the invention may be contained completely within the support material. The support material is then a mixed oxide, wherein one component of the mixed oxide is formed by cerium oxide. If the oxygen storing capacity of the support material is already sufficient for the intended purpose, additional coating of the support material with cerium oxide is not required. In the case of support materials which do not contain any cerium oxide the required oxygen storage capacity must be provided by coating with cerium oxide, wherein the cerium oxide is then present on these materials together with the stabilizers in highly dispersed form. Suitable support materials which do not contain any cerium oxide are aluminum oxide, zirconium oxide, titanium oxide, silicon dioxide or mixed oxides thereof.

Materials, with high surface areas in the context of this invention are materials whose specific surface area, or BET surface areas (measured in accordance with DIN 66132), is at least 10 m$^2$/g. So-called active aluminum oxides satisfy this condition. These are finely divided aluminum oxides which have the crystal structures of the so-called transition phases of aluminum oxide. These include chi-, delta-, gamma-, kappa-, theta- and eta-aluminum oxide. These types of materials have specific surface areas between about 50 and 400 m$^2$/g. Zirconium oxide and cerium/zirconium mixed oxides with similarly high surface areas can also be obtained. For the purpose of the invention, suitable cerium/zirconium mixed oxides may be obtained in accordance with EP 0605274 A1 by coprecipitation. They have a concentration of cerium oxide of 60 to 90 wt. %, with respect to the total weight of mixed oxide. As an alternative, zirconium-rich cerium/zirconium mixed oxides, with a concentration of cerium oxide of only 10 to 40 wt. %, with respect to the total weight of the mixed oxide, may be used.

The stabilizer(s) and optionally cerium oxide in highly dispersed form are applied to these support materials by appropriate techniques.

It has been shown that the support materials mentioned, when they have at least one stabilizer in highly dispersed form on their specific surface area, have an extraordinarily high thermal and long term stability. Materials which are called thermally and long term stable in the context of this invention are materials which, after calcination in air at a temperature of 900° C. for a period of ten hours, still have a specific surface area of at least 20, preferably at least 30 m$^2$/g. For this degree of stabilization it is sufficient to apply 0.1 to 10 wt. % of stabilizers, with respect to the total weight of oxygen storing material. A concentration of less than 0.1 wt. % does not provide sufficient stabilization. With more than 10 wt. %, no substantial increase in thermal stability is observed.

The oxygen storing material has a particularly high thermal stability if the stabilizers are present on the support material with crystallite sizes of less than 7 nm. In this case the stabilizers are also called X-ray amorphous because substances with such small crystallite sizes no longer have discrete X-ray diffraction patterns.

In a particular embodiment of the invention, a cerium/zirconium mixed oxide is used as a high surface area support material with a concentration of 60 to 90 wt. % of cerium oxide, with respect to the total weight of mixed oxide. To stabilize this material it is sufficient to simply apply the stabilizer(s) to the surface area in highly dispersed form.

In a further embodiment of the invention, zirconium oxide or aluminum oxide is used as a high surface area support material. In order to provide the support material with sufficient oxygen storage capacity and also outstanding thermal and long term stability, cerium oxide and one or more stabilizers are applied in highly dispersed form onto the zirconium oxide or aluminum oxide, wherein the concentration of cerium oxide in the final material is 5 to 60 wt. %, with respect to the total weight of oxygen storing material.

Praseodymium oxide is preferably used to stabilize the oxygen storing material.

Stabilizers and optionally cerium oxide can be deposited onto the selected support material in a number of different ways. It is important that the deposition process ensures the deposition of the stabilizers and the cerium in a highly dispersed form. The homogeneous precipitation process has proven to be particularly suitable. In this process the stabilizers and optionally cerium are used in the form of soluble precursor compounds. Nitrates, acetates, chlorides and other soluble compounds, for example, are suitable.

In the case of the pore volume impregnation process frequently used in the prior art, the precursor compounds are dissolved in an amount of water which corresponds to 70 to 100, preferably 80 to 90% of the previously-determined water absorption capacity of the actual support material used. This solution is thoroughly distributed over the support material rotating in a drum, by using spray nozzles for example. The powder being produced is still free-flowing despite the water content. It is then calcined to fix the stabilizers and/or the cerium on the specific surface area of the support material, in air or under an inert atmosphere. Here calcination is performed at a temperature between 300 and 800°, preferably 500 to 700° C., for a period of 0.5 to 3 hours.

The disadvantage of this process, inter alia, is the fact that only a restricted volume of solvent is available for the precursor compounds. Depending on the solubility of these compounds, therefore, only restricted amounts can be deposited onto the support material using this process. If larger deposited amounts are required then the pore volume impregnation process has to be repeated, optionally several times, wherein before each new impregnation process, thermal decomposition of the precursor compounds for the stabilizers and/or the cerium has to take place. However this involves a risk of undesired crystallite growth, so that, after concluding multiple impregnation processes, the stabilizers and optionally cerium may in some circumstances no longer be present in the preferred X-ray amorphous form.

This restriction on amounts does not apply to the homogeneous precipitation process described by Dillen et al for the deposition of nickel and copper. To perform this process, the finely divided support material, together with the precursor compounds for cerium and the stabilizers, can be dispersed or dissolved in water. Preferably, however, a separate solution of precursor compounds is made up which is slowly stirred into the dispersion of support material. The so-called capillary injection method may be used, for example, for this purpose. The solution of precursor compounds is then injected into the dispersion, below the surface of the aqueous support dispersion, using one or several capillaries and rapidly distributed over the entire volume of the dispersion using a stirrer.

When preparing the mixture of dispersion and solution of precursor compounds, there may be a certain amount of adsorption of the precursor compounds on the surface of the support material and thus the production of crystallization nuclei. The extent of this adsorption depends on the material combination support material/stabilizers. The actual deposition of stabilizers and optionally of cerium, however, takes place by means of chemical precipitation. For this, a dilute aqueous base, preferably a dilute ammonia solution (1 to 5 wt. % of $NH_3$ in water) is introduced by capillary injection into the dispersion. The rate of injection is chosen so that as rapid and homogeneous as possible a distribution of the ammonia solution throughout the volume of the dispersion is ensured. Rates of injection R of 1 to $4 \times 10^{-5}$ ml of $NH_3$ solution per minute per ml of water and per g of support material have proven useful:

$$R = 1 \ldots 4 \times 10^{-5} \frac{(ml\ NH_3\ solution)}{(min \times ml\ H_2O \times g\ support\ material)}$$

The formula given above may be used as a guideline for a suitable rate of injection. It is important when fixing the rate of injection, that precipitation of the stabilizers does not take place in the aqueous phase of the dispersion but on the condensation nuclei formed on the support surface. A suitable rate of injection can easily be determined by appropriate trials.

Due to the injection of a base or the ammonia solution, the pH of the mixture of dispersion and dissolved precursor compounds which is initially in the acid region (pH between 1 and 7, depending on the acidity of the support material), slowly rises to a value of 8 to 10. The precursor compounds are then precipitated in the form of their hydroxides and are deposited onto the surface area of the support material.

The homogeneous precipitation process provides chemical fixing of the precursor compounds on the support material. Subsequent thermal fixing by calcination, such as in the case of pore volume impregnation, is not required. To prepare a coating dispersion for the inert catalyst carrier structure, the dispersion may be dewatered after terminating the precipitation process, dried and optionally calcined, before the oxygen storing material obtained in this way is again dispersed with other coating components which are then deposited onto the carrier structure for example in an immersion process. Due to the chemical fixing of the precursor compounds onto the support material, however, there is also the possibility of further processing the dispersion immediately after completion of chemical precipitation, to give a coating dispersion, by adding further coating components.

Figure 1:
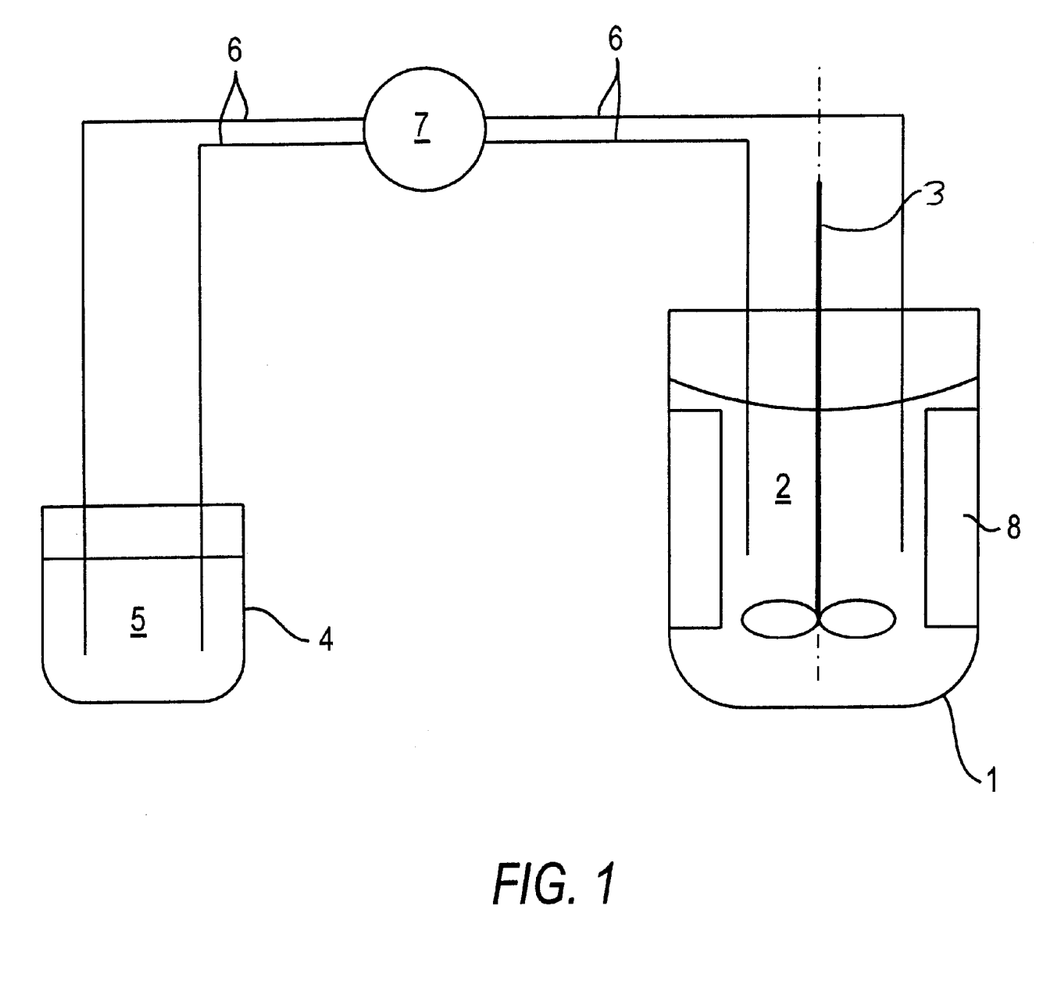
FIG. 1 is a schematic representation of the apparatus to perform homogeneous precipitation according to the invention.

Referring now to FIG. 1, this shows the layout in schematic form of an apparatus for performing the preferred homogeneous precipitation process. An aqueous dispersion 2 of the support material is placed in vessel 1 with a volume of 2 l. From storage vessel 4, a ready-made, common solution of precursor compounds 5 for the stabilizers and optionally for cerium is injected below the surface into dispersion 2 using one or more capillary tubes 6 (internal diameter about 1 mm). The dispersion is constantly and vigorously stirred using the stirrer 3 (1200 rpm). Baffles 8 intensify the thorough mixing of the dispersion. A hose pump 7 is provided for pumping the ingredients. After injecting the solution, a dilute ammonia solution is injected in a precisely analogous manner into the mixture of dispersion and solution of precursor compounds which is now present, from another storage vessel which is not shown here, and the precursor compounds are precipitated onto the support material by increasing the pH of the mixture to values above 8 and up to 10.

The apparatus shown here is suitable for small batches of material and was also used in this form for the following examples. The homogeneous precipitation process, however, may also be performed continuously by passing the dispersion of support material in a continuous stream through a stirring or milling unit. For homogeneous mixing of the precursor compounds and ammonia solution, two such units may be attached in series. The solution of precursor compounds and the ammonia solution are expediently introduced directly into the stirring or milling units.

For the following examples, a cerium/zirconium mixed oxide and a pure zirconium oxide were used as support materials for praseodymium oxide and cerium oxide. The properties of these support materials are listed in table 1.

Model catalysts were prepared using the powdered oxygen storing materials prepared in the examples, by adding aluminum oxide-and activating with palladium, and these were tested with regard to their light-off behavior and their percentage conversion rates at the cross-over point of the CO and $NO_x$ conversion curves (cross-over point). In addition to the powders modified with praseodymium oxide and cerium oxide, the pure powders themselves were also used to prepare catalysts. In the following examples the different powders are named with the sequence of letters from A to I. A designates the pure cerium/zirconium mixed oxide and E the pure zirconium oxide.

TABLE 1

| Powder | Composition | BET surface area (m$^2$/g) | Particle size d$_{50}$ (μm) |
|---|---|---|---|
| A | CeO$_2$/ZrO$_2$ 70/30 | 60 | 30 |
| E | ZrO$_2$ | 100 | 10 | d$_{50}$: particle diameter which is equal to or greater than the diameter of 50 wt. % of the material.

EXAMPLE 1

Powder A was impregnated with an aqueous solution of praseodymium nitrate [Pr(NO$_3$)$_3$.5H$_2$O)] using pore volume impregnation. During pore volume impregnation, the component being applied by impregnation is dissolved in a volume of solvent which corresponds to 80 to 100% of the absorption capacity of the powder for the relevant solvent, After drying the impregnated powder at 120° C. it was calcined in air at 600° C. for 2 hours in order to convert the praseodymium nitrate into the corresponding oxide. In order to ensure uniform heating throughout the powder being treated, the temperature was increased to the desired 600° C. over the course of 4 hours. The final powder contained 5 wt. % of praseodymium oxide (Pr$_6$O$_{11}$), with respect to the total weight of powder. This material is called powder B in the following.

EXAMPLE 2

In order to compare powder B with a material of the same composition but which had been prepared by coprecipitation, an aqueous solution of cerium nitrate, zirconyl nitrate and praseodymium nitrate was made up. The solution had a pH of 2. Cerium, zirconium and praseodymium were precipitated simultaneously in the form of their hydroxides by slowly adding a dilute ammonia solution. The precipitate was filtered off, washed, dried at 120° C. and then calcined at 600° C. in air for a period of 2 hours in order to convert the hydroxides into the corresponding oxides. The rate of heating to the final temperature of 600° C. was performed in the same way as in example 1. The final material (powder C) contained, like powder B, 66.5 wt. % of cerium oxide, 28.5 wt. % of zirconium oxide and 5 wt. % of praseodymium oxide.

EXAMPLE 3

Powder A was dispersed in water and coated with praseodymium by means of the homogeneous precipitation process using praseodymium acetate and 5 wt. % strength ammonia solution. As in the preceding examples, the coated powder was filtered off, dried at 120° C. and then calcined in air at 600° C. for a period of 2 hours. This powder is called powder D in the following. It had the same composition as powders B and C.

EXAMPLE 4

Powder E was coated with a total of 20 wt. % of cerium oxide, with respect to the total weight of the final material, by means of pore volume impregnation using cerium nitrate. Drying and calcination were performed in the same way as in the preceding examples. The material obtained in this way is called powder F in the following.

EXAMPLE 5

Powder E was coated with a total of 20 wt. % of cerium oxide, with respect to the total weight of the final material, by means of homogeneous precipitation using cerium nitrate. Drying and calcination were performed in the same way as in the preceding examples. The material obtained in this way is called powder G in the following.

EXAMPLE 6

Powder E was coated by means of pore volume impregnation using praseodymium nitrate and cerium nitrate [Ce(NO$_3$)$_3$.6H$_2$O] in the molar ratio Ce:Pr of 10:1. The material was dried and calcined in the same way as in the preceding examples. The final powder contained 79 wt. % of zirconium oxide, 19 wt. % of cerium oxide and 2 wt. % of praseodymium oxide, each with respect to the total weight of final powder, and is called powder H in the following.

EXAMPLE 7

Powder B was coated with the same amounts of cerium oxide and praseodymium oxide in the same way as described in example 6. Differently from example 6, coating was performed by means of a homogeneous precipitation process. The powder is called powder I in the following.

Table 2 gives a summary of the powders used for the following tests:

TABLE 2

Powdered materials

| Powder | Composition | Method of preparation |
|---|---|---|
| A | CeO$_2$/ZrO$_2$ 70/30 | Support material, pure mixed oxide |
| B | CeO$_2$/ZrO$_2$/Pr$_6$O$_{11}$ 66.5/28.5/5 | Powder A + pore volume impregnation with praseodymium nitrate |
| C | CeO$_2$/ZrO$_2$/Pr$_6$O$_{11}$ 66.5/28.5/5 | Coprecipitation of cerium, zirconium and praseodymium nitrates |
| D | CeO$_2$/ZrO$_2$/Pr$_6$O$_{11}$ 66.5/28.5/5 | Powder A + homogeneous precipitation of praseodymium acetate |
| E | ZrO$_2$ | Support material, pure zirconium oxide |
| F | ZrO$_2$/CeO$_2$ | Powder E + pore volume impregnation with cerium nitrate |
| G | ZrO$_2$/CeO$_2$ | Powder E + homogeneous precipitation of cerium nitrate |
| H | ZrO$_2$/CeO$_2$/Pr$_6$O$_{11}$ 79/19/2 | Powder E + pore volume impregnation with cerium and praseodymium nitrates |
| I | ZrO$_2$/CeO$_2$/Pr$_6$O$_{11}$ 79/19/2 | Powder E + homogeneous precipitation of cerium and praseodymium nitrates |

EXAMPLE 8

The powdered materials in table 2 were subjected to calcination in air at 900° C. for a period of 10 hours as an ageing procedure. The rate of heating to the final temperature of 900° C. was 225° C. per hour.

Then the specific surface area of all the materials was determined in accordance with DIN 66132. The results of these measurements are given in table 3.

TABLE 3

| Powder | BET surface area ($m^2/g$) | Method |
|---|---|---|
| A | 34 | Pure mixed oxide |
| B | 42 | Pore volume impregnation |
| C | 21 | Coprecipitation |
| D | 46 | Homogeneous precipitation |
| E | 14 | Pure zirconium oxide |
| F | 29 | Pore volume impregnation |
| G | 34 | Homogeneous precipitation |
| H | 39 | Pore volume impregnation |
| I | 47 | Homogeneous precipitation |

The X-ray crystallite sizes of zirconium oxide in the powder particles in the fresh condition, that is to say after the first calcination at 600° C., and after ageing, that is after calcination for 10 hours at 900° C., were determined for powder materials F to I. The experimental results are given in table 4:

TABLE 4

| Powder | $ZrO_2$ crystallite sizes in the fresh state (nm) | $ZrO_2$ crystallite sizes after ageing (nm) |
|---|---|---|
| F | 35.1 | 40.2 |
| G | 19.4 | 40.8 |
| H | 23.8 | 29.3 |
| I | 23.1 | 25.1 |

Figure 2:
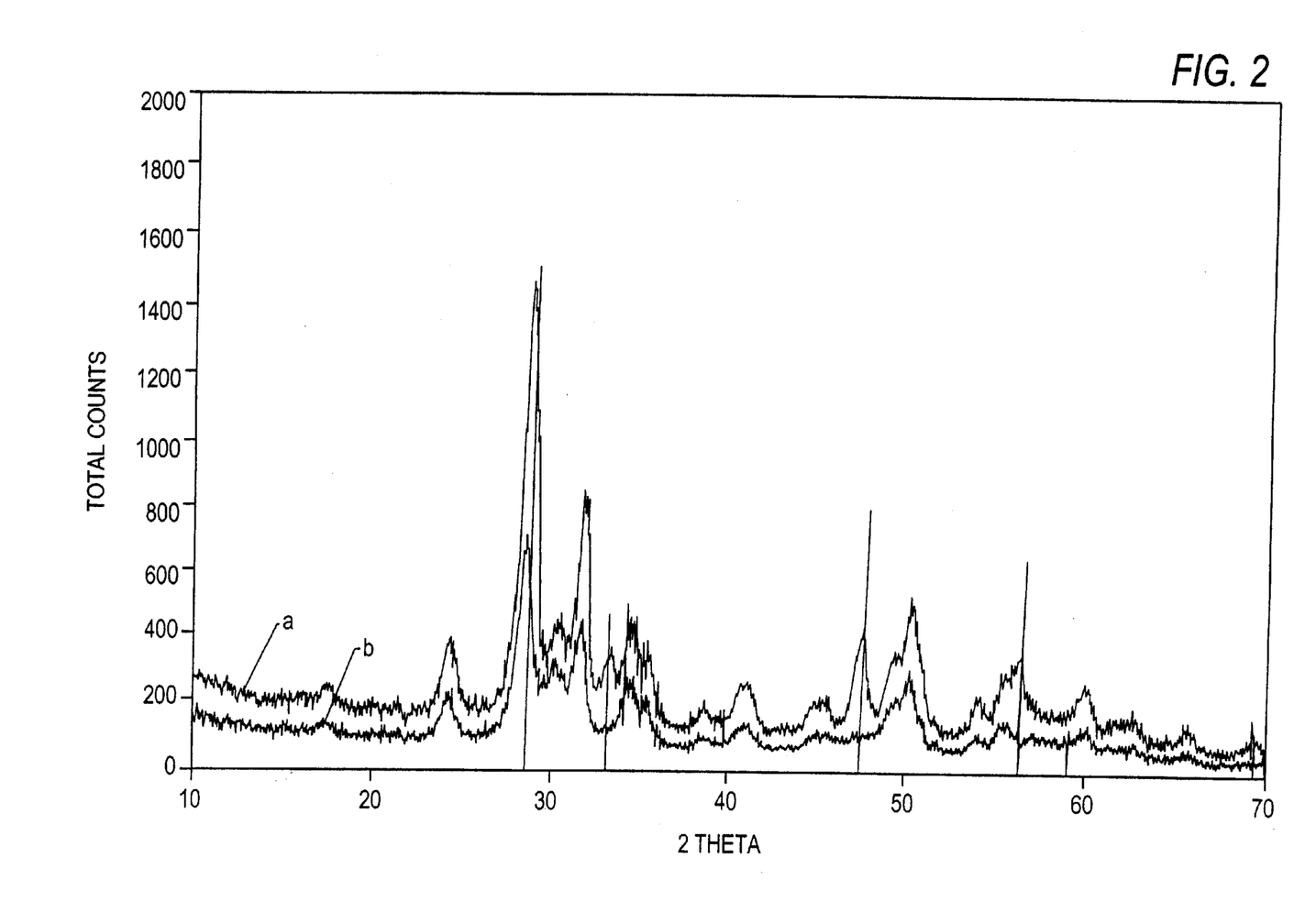
FIG. 2 is an X-ray diffraction pattern of powders H and I in the freshly prepared state after calcination at 600° C. for period of two hours.

FIG. 2 shows the X-ray diffraction patterns for powders H (curve a)) and I (curve b)) in the fresh state after the initial set of final calcinations at 600° C. for a period of 2 hours. Both powders contain identical amounts of cerium oxide and praseodymium oxide on the zirconium oxide support.

Both diffraction patterns clearly show the structure of the support. This is a mixture of monoclinic and tetragonal phases of zirconium oxide, recognizable by the triplet diffraction pattern at a diffraction angle $2\theta=30°$.

Curve a) is overlaid with additional diffraction bands which can unambiguously be assigned to cerium oxide. The vertical lines in FIG. 2 show the positions of the diffraction bands for pure cerium oxide. The diffraction pattern of powder I, however, does not show the overlaid bands of cerium oxide despite having the same concentration of cerium oxide.

It can be concluded from these facts that the cerium oxide in powder H, which was prepared by pore volume impregnation, is present in the form of relatively large crystallites on the zirconium oxide support. On the other hand, the deposition of cerium oxide onto the zirconium oxide takes place in an X-ray amorphous form during homogeneous precipitation. The formation of a mixed oxide of cerium oxide and zirconium oxide can be excluded at the temperature chosen for calcination, 600° C. The formation of a mixed oxide would also have been obvious from a shift in the diffraction bands of zirconium oxide. This however is not the case.

Figure 3:
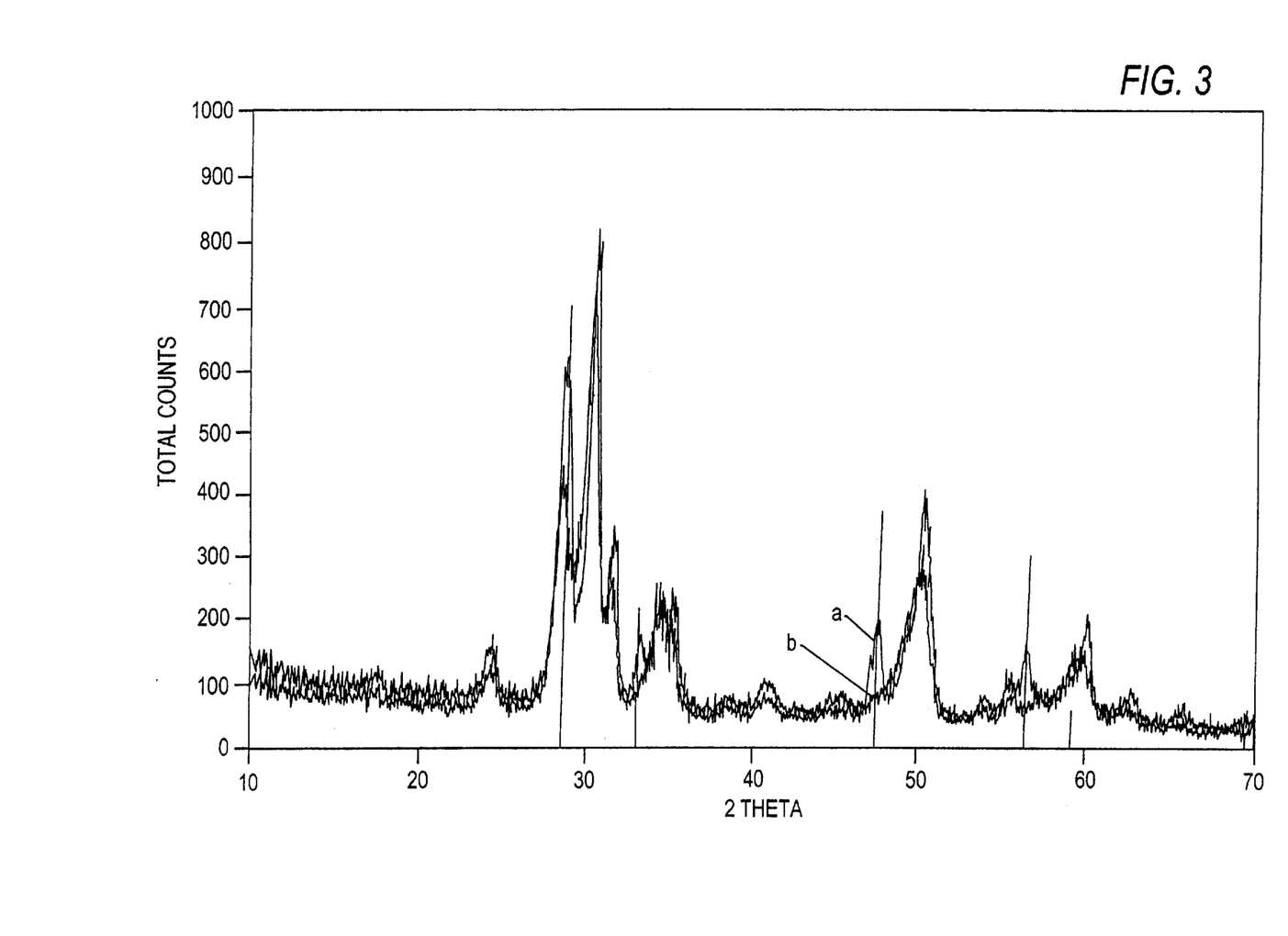
FIG. 3 is an X-ray diffraction pattern of powders H and I after ageing (calcination at 900° C. for a period of 10 hours)

FIG. 3 shows the diffraction diagrams of powders H and I after ageing at a temperature of 900° C. for a period of 10 hours. Curve a) for powder H shows the additional diffraction bands for cerium oxide. The width of these diffraction bands has been reduced due to the ageing procedure which indicates growth of the cerium oxide crystallites.

Curve b) for powder I, however, shows only the diffraction bands for zirconium oxide, that is the cerium oxide content of this powder is still in X-ray amorphous form on the zirconium oxide. There has been no growth in particle size and the formation of a mixed oxide is not observed.

The homogeneous precipitation process in accordance with the present invention therefore leads to deposition of the cerium oxide and stabilizers on the particular support materials in a highly dispersed X-ray amorphous form. The dispersion of deposited substances is stable up to temperatures of 900° C. These positive properties of oxygen storing materials according to the invention are also demonstrated by the stability of the specific surface area (see table 3) and during use in exhaust gas treatment catalysts.

Application Example

Catalysts were made up using catalysts A to D and their light-off points $T_{50}$ were determined for the conversion of the hazardous substances carbon monoxide CO, hydrocarbons HC and nitrogen oxides $NO_x$. The light-off point is understood to be the particular exhaust gas temperature at which 50% of the hazardous substance being considered is converted by the catalyst.

To make up the catalysts, the powdered materials mentioned were each dispersed in water together with a high surface area active aluminum oxide (specific surface area 140 $m^2/g$) in the ratio by weight of 1:5. Honeycomb carrier structures made of cordierite with a cell density (number of flow channels per square centimeter of cross-sectional area) of 62 $cm^{-2}$ and flow channel wall thickness of 0.2 mm were coated with these coating dispersions by immersion. The coating was then dried and calcined at 500° C. for a period of 3 hours. Then the coating was impregnated by immersion of the honeycomb carrier structure in a solution of palladium nitrate, again dried and calcined at 300° C. The final catalysts contained 100 g of aluminum oxide, 20 g of the particular powdered material and 2.1 g of palladium, each with respect to one liter of honeycomb structure volume.

The catalysts prepared are designated by the letters A to D in accordance with the oxygen storing material used during their production. Before measuring the light-off temperatures for the three hazardous substances CO, HC and $NO_x$ and the so-called cross-over point $CO/NO_x$, the catalysts were subjected to a hydrothermal ageing procedure for a period of 16 hours at a temperature of 960° C. The hydrothermal ageing procedure consisted of placing the catalysts in a gas stream of 10 vol. % water vapor, the remainder being nitrogen, at the temperature mentioned.

Table 5 shows the light-off temperatures for the three different hazardous substances and the cross-over point $CO/NO_x$ for the conversion of carbon monoxide and nitrogen oxides under dynamic operation for the aged catalysts.

TABLE 5

| Catalyst | CO $T_{50}$ (° C.) | HC $T_{50}$ (° C.) | $NO_x$ $T_{50}$ (° C.) | $CO/NO_x$ (%) |
|---|---|---|---|---|
| A | 336 | 336 | 317 | 51.7 |
| B | 310 | 310 | 287 | 58.8 |
| C | 317 | 317 | 325 | 65.4 |
| D | 288 | 284 | 293 | 79.1 |

Advantageous factors for using oxygen storing materials in catalysts for exhaust gas treatment of internal combustion engines are the lowest possible light-off temperatures for the catalysts prepared with these substances and the highest possible cross-over point. All-in-all catalyst D exhibited a more favorable set of properties than the comparison catalysts A, B and C.

To determine the cross-over points given in table 5, the catalysts were subjected to a synthetic exhaust gas with the composition given in table 6 at a temperature of 400° C. and a space velocity of 50,000 $h^{-1}$, in a synthesis gas unit.

TABLE 6

Composition of the exhaust gas

| Exhaust gas component | Concentration (vol. %) |
|---|---|
| $CO_2$ | 14.00 |
| CO | 0.0975 |
| $H_2$ | 0.0325 |
| NO | 0.100 |
| propene | 0.033 |
| propane | 0.016 |
| $H_2O$ | 10.0 |
| $O_2$ | — |
| $SO_2$ | 0.001 |
| $N_2$ | remainder |

In order to determine the cross-over point, the normalized air/fuel ratio λ of the exhaust gas was increased linearly from 0.99 to 1.03 by adding oxygen over the course of 10 minutes and then lowered again at the same rate. This slow change in normalized air/fuel ratio was modulated by a periodic change in the normalized air/fuel ratio using a frequency of 0.5 Hz and an amplitude of $\Delta\lambda=\pm0.059$ (dynamic operation).

Figure 4:
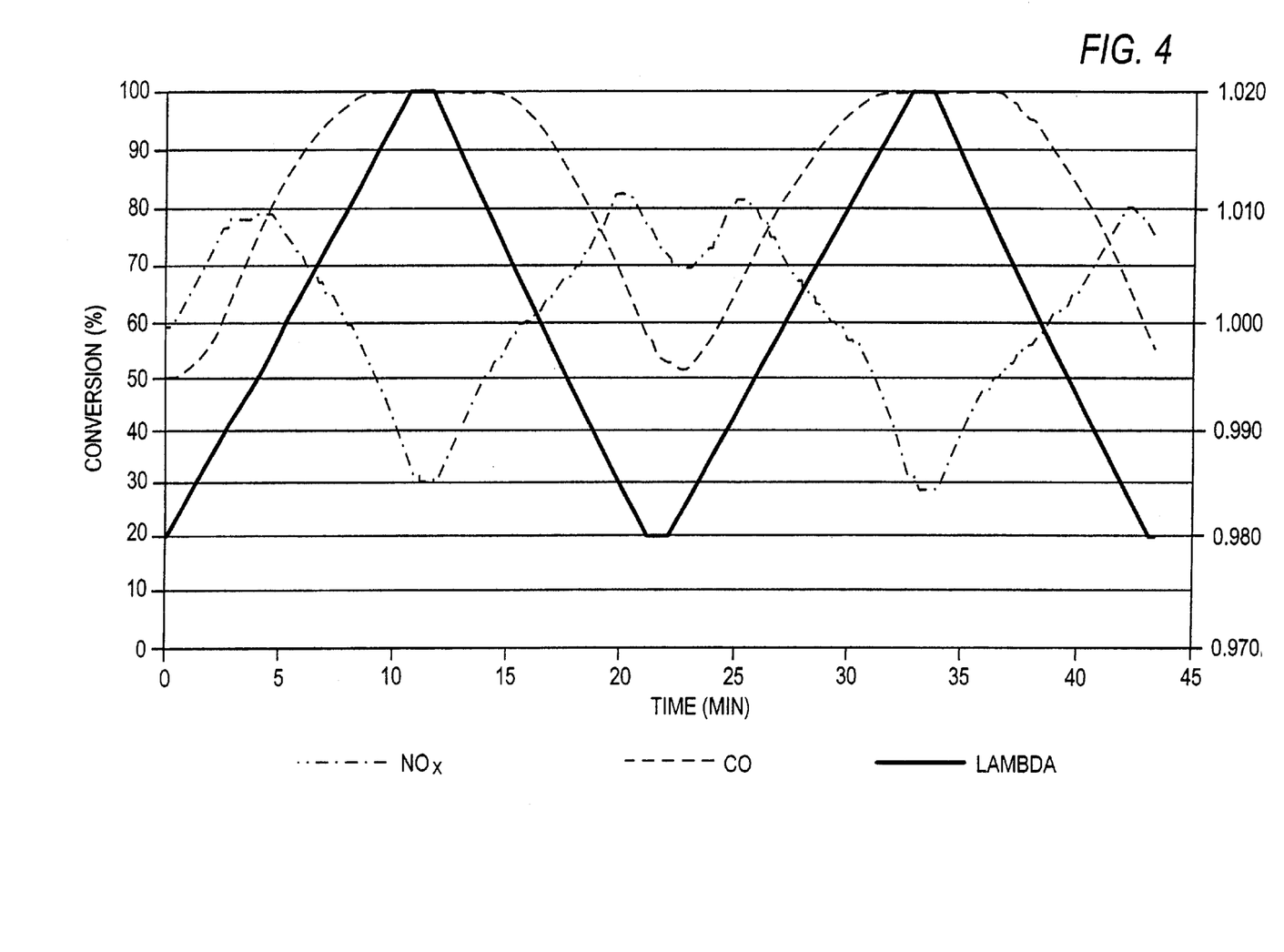
FIG. 4 is a graph of a plot of the change in conversion rates with time for carbon monoxide and nitrogen oxides when varying the normalized air/fuel ratio λ in order to determine the cross-over point.

While subjecting the catalysts to these strains, their rates of conversion for carbon monoxide CO and nitrogen oxides $NO_x$ were measured and plotted against time in a diagram shown in FIG. 4. The diagram in FIG. 4 shows the experimental curves for catalyst D. The value of the percentage conversion when the conversions for carbon monoxide and nitrogen oxides are the same (cross-over point) can be read off from this diagram.

Further variations and modifications will be apparent to those skilled in the art from the foreign and are intended to be encompassed by the claims appended hereto.

German priority application 197 14 707.0 is relied on and incorporated herein by reference.

What is claimed is:

1. An oxygen storing material with high thermal stability comprising:
   cerium oxide, and
   at least one stabilizer selected from the group consisting of praseodymium oxide, lanthanum oxide, yttrium oxide and neodymium oxide,
   wherein the stabilizer is present in highly dispersed form by homogenous precipitation directly on the surface of a support material having a specific surface area of at least 10 $m^2/g$ and an average particle size in the range of about 10 μm and 30 μm and the oxygen storing material has a specific surface area of more than 20 $m^2/g$, after calcination in air at 900° C. for a period of 10 hours.

2. The oxygen storing material according to claim 1, wherein said specific surface area is more than 30 $m^2/g$.

3. The oxygen storing material according to claim 1, wherein the support material is a cerium oxide or a cerium/zirconium mixed oxide.

4. The oxygen storing material according to claim 3, wherein the support material is a cerium/zirconium mixed oxide with a concentration of cerium oxide of 60 to 90 wt. %, with respect to the total weight of the mixed oxide.

5. The oxygen storing material according to claim 1, wherein the support material is a member selected from the group consisting of aluminum oxide, zirconium oxide, titanium oxide, silicon dioxide and mixed oxides thereof, on which the cerium oxide together with the stabilizer are present in highly dispersed form.

6. The oxygen storing material according to claim 5, wherein the support material is zirconium oxide or aluminum oxide, on which the cerium oxide and the stabilizer is present in highly dispersed form,
   wherein the concentration in the oxygen storing material of cerium oxide is 5 to 60 wt. %, with respect to the total weight of oxygen storing material.

7. The oxygen storing material according to claim 1, containing 0.1 to 10 wt. % of stabilizer, with respect to the total weight of oxygen storing material.

8. The oxygen storing material according to claim 7, wherein the stabilizer is present on the support material in an X-ray amorphous form with crystallite sizes of less than 7 nm.

9. The oxygen storing material according to claim 8, wherein the stabilizer is praseodymium oxide.

10. A process for the purification of exhaust gas of an internal combustion engine comprising contacting said gas with a catalyst containing the oxygen storing material according to claim 1.

11. A process for preparing an oxygen storing material comprising:
   adding a dissolved precursor of a stabilizer selected from the group consisting of praseodymium oxide, lanthanum oxide, yttrium oxide and neodymium oxide and optionally a dissolved precursor of cerium oxide to a previously prepared aqueous dispersion of a support material with constant stirring and then
   precipitating by homogenous precipitation said precursor or precursors onto the support material by slowly increasing the pH of the dispersion to a value of 8 to 10 by adding a base.

12. The process for preparing an oxygen storing material according to claim 11, wherein the dissolved precursors of the stabilizer and of the cerium oxide are introduced into the aqueous dispersion of the support material by injecting said dissolved precursors into said aqueous dispersion below the surface thereof.

13. The process according to claim 11, wherein said injecting is by capillary tube.

14. An oxygen storing material with high thermal stability comprising:
   cerium oxide, and
   at least one stabilizer selected from the group consisting of praseodymium oxide, lanthanum oxide, yttrium oxide and neodymium oxide,
   wherein the stabilizer is present in highly dispersed form by homogenous precipitation on the surface of a support material having a specific surface area of at least 10 $m^2/g$ and an average particle size in the range of about 10 μm and 30 μm and the oxygen storing material has a specific surface area of more than 20 $m^2/g$, after calcination in air at 900° C. for a period of 10 hours, and
   wherein said oxygen storing material is prepared by adding a dissolved precursor of the stabilizer selected from the group consisting of praseodymium oxide, lanthanum oxide, yttrium oxide and neodymiun oxide and optionally a dissolved precursor of cerium oxide to a previously prepared aqueous dispersion of a support material with constant stirring and then precipitating said precursor or precursors onto the support material by slowly increasing the pH of the dispersion to a value of 8 to 10 by adding a base.

15. An oxygen storing material with high thermal stability according to claim 14, wherein the dissolved precursors of the stabilizer and of the cerium oxide are introduced into the aqueous dispersion of the support material by injecting said dissolved precursors into said aqueous dispersion below the surface thereof.

16. An oxygen storing material with high thermal stability according to claim 14, wherein the dissolved precursor of the stabilizer and cerium oxide are introduced into the aqueous dispersion of the support material by injecting said stabilizer and cerium oxide into said aqueous dispersion below the surface thereof.

17. An oxygen storing material with high thermal stability according to claim 15, wherein said injecting is by capillary tube.

* * * * *